May 16, 1950 J. W. DAWSON 2,508,103
CONDENSER WELDING SYSTEM
Filed Dec. 14, 1939 2 Sheets-Sheet 1

JOHN W. DAWSON
INVENTOR
BY Elmer J. Gorn
ATTORNEY.

John W. Dawson
Inventor
By Elmer J. Gorn
Attorney

Patented May 16, 1950

2,508,103

UNITED STATES PATENT OFFICE 2,508,103

CONDENSER WELDING SYSTEM

John W. Dawson, Auburndale, Mass., assignor to Raytheon Manufacturing Company, Newton, Mass., a corporation of Delaware Application December 14, 1939, Serial No. 309,124

44 Claims. (Cl. 219—4)

This invention relates to condenser welding systems, and more particularly those systems in which electrical energy is stored in a condenser and then discharged through a welding transformer to deliver welding current to a resistance welding load. In ordinary condenser welding of this type, the current in the welding load is oscillatory, and thus power is delivered in series of gradually decreasing pulses. For many types of welding loads it is desirable to deliver substantially all of the energy to the load at the beginning of the weld, and to avoid the gaps in the supply of energy which occur during the usual condenser welding. This result can be secured if the condenser discharge current is fed to the load in such a manner that the current in the load rises rapidly and then decays substantially exponentially.

An object of this invention is to devise a condenser welding system of the foregoing type in which oscillations of the welding current are eliminated.

Another object is to devise a condenser welding system in which the welding load current rises rapidly and decreases exponentially.

A further object is to increase the efficiency of the utilization of power in such condenser welding, and thus enable smaller apparatus to be used for a desired amount of power.

Another object is to provide a system of the above type in which uniformity in current magnitude and form is secured for successive welding operations.

A still further object is to devise such an arrangement which is simple, reliable and inexpensive.

The foregoing and other objects of this invention will be best understood from the following exemplifications of my invention, reference being had to the accompanying drawings, wherein.

Figures 1, 5:
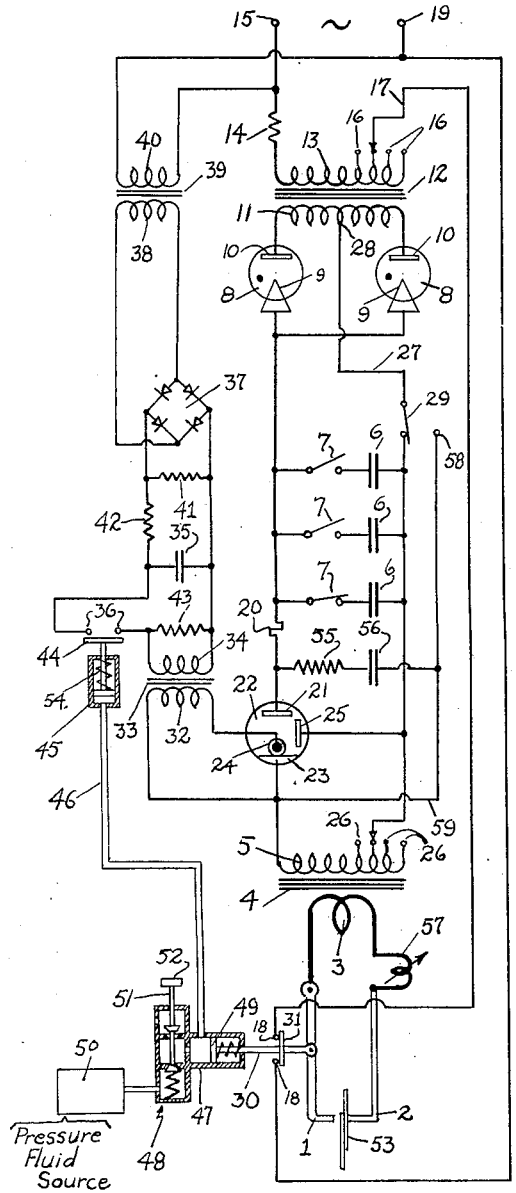
Fig. 1 is a diagram of a condenser welding system embodying my invention.
Fig. 5 is a diagram illustrating another modification in which two tubes of the controlled ignition type are utilized for the purpose of controlling the condenser discharge current.

In the arrangement shown in Fig. 1, welding current is to be supplied to a pair of welding electrodes 1—2 from the secondary winding 3 of a welding transformer 4. The magnetic core of this welding transformer preferably has a small air gap to take care of any D. C. saturation. The welding transformer 4 is also provided with a primary winding 5 adapted to be energized by the discharge from one or more condensers 6. A plurality of such condensers 6 may be provided, each with a switch 7 so that it may be connected or disconnected from the system. In this way a variation of the amount of capacity in the system may be provided. The condensers 6 may be of any convenient form. Since in most forms of my invention the current to these condensers is substantially unidirectional, electrolytic condensers may conveniently be utilized. The condensers 6 are adapted to be charged from any suitable source of direct current, such as, for example, a direct current generator, battery, rectifier, or the like. In Fig. 1 the direct current is shown as being supplied from a pair of rectifier tubes 8. These tubes may be of the gas or vapor-filled type having permanently energized cathodes 9. These cathodes may be of the thermionic filament type, or any other suitable type of cathode. The rectifier tubes 8 are provided with anodes 10 which are connected to opposite sides of the secondary winding 11 of a charging transformer 12. This charging transformer is provided with a primary winding 13, one side of which is connected through a current-limiting impedance 14 to an input terminal 15. In an actual embodiment of my invention with a supply voltage of 440 volts, this was a resistance of the order of 40 ohms. Where it is desired to still further increase the efficiency of this system, the impedance 14 may be an inductance. The primary winding 13 may be provided with a series of taps 16 so as to adjust the value of voltage which is supplied to the condensers 6. A connection 17 extends from one of the taps 16 through a pair of control contacts 18 to an input terminal 19. The input terminals 15 and 19 are connected to a suitable source of alternating current. The two cathodes 9—9 are connected together through a low value of resistance 20 to one anode 21 of a controlled ignition discharge tube 22. In the embodiment of my invention mentioned above, the resistance 20 had a value of about 0.2 ohm. The tube 22 is preferably of the pool cathode type with an igniter for initiating a cathode spot on the pool in order to cause the tube to conduct current. Although any suitable type of igniter may be used, it preferably is of the type described and claimed in the copending application of Percy L. Spencer, Serial No. 303,963, filed November 13, 1939, now Patent No. 2,290,897, dated July 28, 1942, for an improvement in Arc igniting devices, consisting of a conductor separated and insulated from the cathode by a thin glass layer. The tube 22 is provided with a pool cathode 23 preferably of mercury, an igniter 24 preferably of the type as explained above, and a second anode 25. The cathode 23 is connected directly to one side of the primary winding 5. This primary winding is also preferably provided with a series of taps 26. A connection 27 extends from one of the taps 26 to a center tap 28 on the secondary winding 11 of the charging transformer 12. Included in the connection 27 is a switch 29 whose purpose will be described hereinafter. The second anode 25 is connected directly to the connection 27, and thus provides a unidirectionally conductive shunt path between the cathode 23 and the anode 25 across the primary winding 5 during a portion of the welding operation.

The welding electrode 2 is usually stationary while the electrode 1 is movable toward and away from the stationary electrode. This motion may be produced by a thrust rod 30 connected to the electrode 1. This thrust rod carries an armature 31 which in the open position of the electrode 1 closes the contacts 18—18. Therefore, during the open or idle position of the welding electrodes, the primary winding 13 is energized from the terminals 15 and 19, and direct current is supplied to the condensers 6 which are thus charged to the potential as determined by the setting of the taps 16. The voltage thus supplied to the condensers may be of the order of 2000 volts, although widely varying values of voltage may be utilized with various sizes of condensers in order to obtain different amounts of energy to be supplied to the welding load. In this way a predetermined amount of energy is stored in the condensers. This amount of energy is controlled by the setting of the taps 16, and also by the number of condensers 6 which are connected to the system. Either or both of these energy control features may be utilized.

The tube 22 is normally non-conducting, and thus condensers 6 retain their charge until the tube 22 is ignited. The igniter 24 is supplied with igniting impulses from the secondary winding 32 of the igniting transformer 33. This transformer is provided with a primary winding 34 which is supplied with current impulses from a condenser 35. One side of this condenser is connected to one side of the primary winding 34, while the other side is connected through a pair of normally open contacts 36 to the other side of said primary winding. The condenser 35 is adapted to be charged with direct current from a full-wave rectifying bridge 37 which may be of the copper oxide rectifier type. The rectifying bridge 37 is energized from the secondary winding 38 of an auxiliary transformer 39 having a primary winding 40 energized from the terminals 15 and 19 with alternating current. Preferably a bleeder resistance 41 is connected across the output of the rectifying bridge 37 in order to stabilize its operation. Connected in series with the charging circuit of the condenser 35 is the relatively high resistance 42 which in the practical system as described above was of the order of about 25,000 ohms. A resistance 43 is preferably connected across the primary winding 34 in order that the igniting impulse which is supplied to the igniter 24 be substantially unidirectional. This action is more fully described and claimed in the copending application of Wilcox P. Overbeck, Serial No. 271,679, filed May 4, 1939, for an improvement in Arc tube systems, now Patent No. 2,270,601, dated Jan. 20, 1942.

The contacts 36 are adapted to be closed by the armature 44 of a pressure-responsive switch 45. This switch is supplied with pressure fluid through a conduit 46 which extends to the pressure cylinder 47 of a pressure gun 48 provided for the purpose of closing the welding electrodes 1 and 2. For this purpose the thrust rod 30 is connected to a piston 49 in the pressure cylinder 47. The piston 49 is normally biased by a spring to open the electrodes 1 and 2. The pressure cylinder 47 is supplied with pressure fluid from some suitable source 50 of such fluid. The pressure fluid may conveniently be compressed air. The supply of pressure fluid to the pressure cylinder 47 is controlled by a valve member 51 which is normally spring-biased to a position in which the pressure fluid is not supplied to the cylinder 47. The valve member 51 has an operating head 52 which may be manually or automatically depressed.

When the operating head 52 is depressed, pressure fluid is supplied to the pressure cylinder 47, causing the electrode 1 to move toward the electrode 2 and clamp a piece of work 53 which is to be welded. This motion of the electrode 1 opens the contacts 18—18 and deenergizes the supply of direct current to the condensers 6. These condensers, however, retain their charge since no discharge path is provided. As the pressure builds up in the cylinder 47, it also builds up in the pressure-responsive switch 45. However the switch 45 is provided with a compression spring 54, and so the armature 44 does not close the contacts 36 until a predetermined pressure has built up in the cylinder 47. Thus the work 53 is firmly clamped by the electrodes 1, 2 before the armature 44 closes the contacts 36. When the contacts 36 are closed in this way, the condenser 35 discharges through the primary winding 34 and delivers an igniting impulse to the igniter 24. This igniting impulse initiates an arc spot on the cathode 23, and the tube 22 starts to conduct current. Since at this time the anode 21 is positive with respect to the cathode 23, due to the charge on the condensers 6, current will flow from the anode 21 to the cathode 23, causing the condensers 6 to discharge. This discharge current flows through the primary winding 5, and delivers welding current to the load 53. In order to insure a reliable firing of the tube 22, a series circuit consisting of a substantially non-inductive resistance 55 in series with a condenser 56 is connected between the anode 21 and its cathode 23. The action of this circuit is more fully described and claimed in said copending application of Wilcox P. Overbeck, Serial No. 271,679, now Patent No. 2,270,601, dated January 20, 1942.

Figure 2:
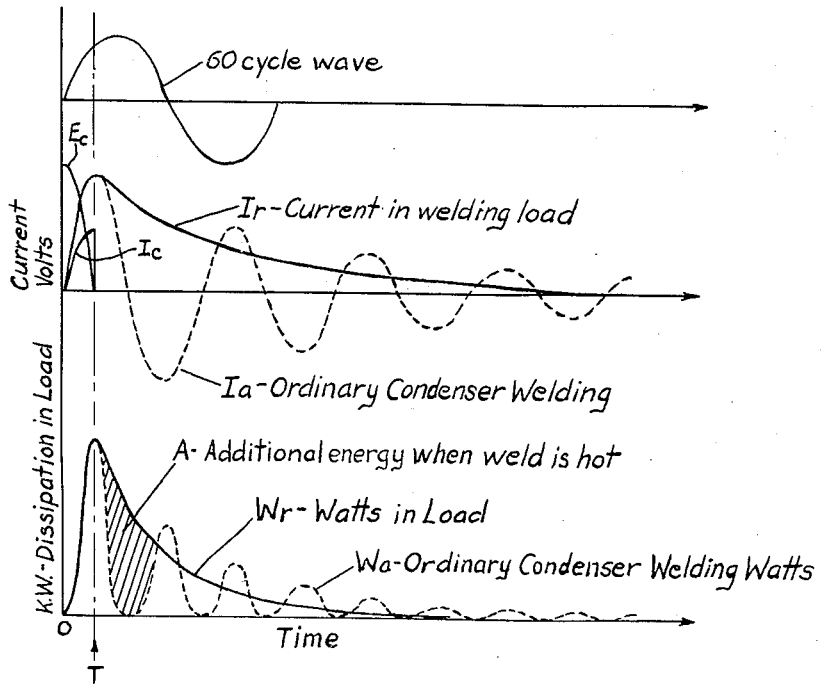
Fig. 2 is a set of curves illustrating the mode of operation of my invention.

The nature of the above discharge current will be best understood by referring to the curves of Fig. 2. At the top of this figure is shown a 60-cycle wave for purposes of reference. In Fig. 2 the time at which the tube 22 is ignited is represented as the initial time. As illustrated by the curve $I_c$, the current through the condensers 6 rises to a maximum value and at the same time the voltage $E_c$ across the condensers falls to zero. During this period the current $I_r$, which represents the current delivered to the welding electrodes 1, 2, rises rapidly to a maximum value. At the point T, a maximum of current is flowing in the load circuit. At this time substantially all of the energy of the condensers 6 has been transferred to the load circuit. That portion of the energy which has not already been consumed in the resistance of the welding load is substantially all stored in magnetic energy in the magnetic field surrounding the conductors leading from the secondary winding 3 to the welding electrodes 1, 2, and surrounding said electrodes 1, 2 themselves. In practice the welding electrodes 1, 2 have considerable length, and since they carry very heavy welding currents of the order between 40,000 and 50,000 amperes, for example, the magnetic field and therefore the energy stored in that field surrounding these welding electrodes are very substantial. As a matter of fact, very little of the transferred energy is stored in the magnetic field in the core of the transformer 4, substantially all of the transferred energy being in the field surrounding the conductors and electrodes, as explained above.

In ordinary condenser welding, the energy stored in the magnetic field of the load circuit, after reaching the maximum value at the time T, would tend to be transferred back through the transformer 4 so as to recharge the condensers 6 in the opposite direction. In ordinary condenser welding, therefore, the current in the welding load would become oscillatory and would follow the curve $I_a$, as illustrated in Fig. 2. Likewise the voltage across the condenser 6 would tend to reverse and oscillate in a similar manner. In my system, however, such reversal of the voltage on the condensers 6 is prevented because, upon such reversal tending to occur, the anode 25, which previously had been negative with respect to its cathode 23, would tend to become positive with respect thereto. Therefore the discharge or arc at the time T transfers from the anode 21 to the anode 25. At this instant, therefore, the current flowing from the anode 21 ceases and the current from the condensers 6 drops to zero, leaving the condensers substantially entirely discharged. The primary winding 5 now being short-circuited through the path between the cathode 23 and the anode 25, the energy from the secondary or welding circuit cannot be transferred back to the condensers. Also, since the short-circuit path has very little energy consumption, very little energy can be taken from the secondary or welding load circuit. Therefore, the current in the welding load circuit will decay substantially exponentially, as indicated by the curve $I_r$. During this decay, substantially all of the energy is consumed in the resistance of the welding circuit where it is intended and desired to be utilized. The form of oscillatory welding current $I_a$ is given by the following formula to a satisfactory degree of accuracy:

$$I_a = \frac{KE}{L\sqrt{\frac{1}{LC}-\frac{R^2}{4L^2}}} \epsilon^{-\frac{R}{2L}t} \sin\sqrt{\frac{1}{LC}-\frac{R^2}{4L^2}}\, t$$

where

K=turn ratio of the transformer 4;
E=maximum voltage on condensers 6;
$t$=time in seconds;
C=capacity in farads of the condensers 6 connected to the system;
L=resultant inductance in henries of the entire circuit referred to the primary wide side of the transformer 4;
R=resultant resistance in ohms of the entire circuit as referred to the primary of the transformer 4.

The current $I_r$ follows the above form until the time T is reached. Thereafter $$I_r = I\epsilon^{-\frac{R}{L}t}$$

where I=the value of current at the time T, which is substantially a quarter period of the oscillatory current $I_a$. It will be noted that the exponential factor $$-\frac{R}{L}$$

in the above equation is twice the value of the exponential factor $$-\frac{R}{2L}$$

in the case of the oscillatory current $I_a$. This shows that the stored energy of the condenser in the present invention is released in substantially half the time required in the case of ordinary oscillatory condenser welding.

On the lower axis of Fig. 2 is plotted by curve $W_r$ the energy dissipation in the load circuit of the present invention as compared with the energy dissipation in the load circuit of ordinary condenser welding, as represented by curve $W_a$. In ordinary condenser welding it will be seen that after the first impulse of energy, there is a gap before the next impulse of energy is supplied to the welding circuit. In accordance with the present invention, however, the energy continues to flow in the load circuit during this period, and therefore an additional amount of energy represented by the cross-hatched area A is supplied to the welding load during this early period of the weld. This is a very desirable feature inasmuch as it is during this period that the supply of energy is most effective in making satisfactory welds. There are various other advantages which arise from securing a welding current which has the characteristics as represented by the curve $I_r$. For example, oscillatory current supplied to the welding electrodes 1, 2 causes considerable chattering or variation of pressure exerted by these electrodes on the welding work. This chattering is substantially eliminated by the present invention. Due to the foregoing and various other causes, welds may be produced much more effectively by the present invention than has heretofore been possible. For example, with a simple and inexpensive arrangement incorporating the present invention, aluminum sheets have been welded together in a very effective and satisfactory manner.

The use of the taps 26 on the primary winding 5 provides means for regulating the rate at which the welding current builds up. In order to increase the rate of building up of the welding current, the number of turns in the primary winding 5 is decreased, while in order to decrease the rate at which the welding current builds up, the number of turns in the primary winding is increased. This adjustment within a practical range, however, does not substantially alter either the value of the peak current supplied to the welding load or the rate of exponential decay of the current.

As indicated above, the welding circuit itself has considerable inductance in its leads. This inductance is represented diagrammatically in Fig. 1 at 57. The inductance 57 is indicated as being variable. Such variation may be produced in any convenient way. For example, the electrodes 1, 2 could be provided in variable lengths which could produce a variation in the inductance 57. Adjustment of the inductance 57 can be used to alter the shape of the welding current both as to the rate of increase and rate of decrease. Increasing the value of inductance 57 will cause the welding current both to increase and decrease at a slower rate, whereas a decrease in the value of said inductance causes the increase and decrease to be faster.

In the operation described above, the current which flows in the primary winding 5 is substantially unidirectional so that there would be some tendency for D. C. saturation of the core of the transformer 4 to occur. As previously indicated, it is desirable to include an air gap in the core of the transformer to take care of this effect. However, it is also desirable to pass current through the primary winding 5 in the opposite direction between welding operations so as to tend to eliminate residual D. C. flux in said core. In Fig. 1, means for accomplishing this effect are provided. Adjacent the switch 29 is an additional contact 58 which in the right-hand position of said switch is connected to the center tap 28 of the secondary winding 11. A connection 59 extends from the additional contact 58 to the left-hand side of the transformer 5. Thus changing the position of the switch 29 from its left-hand to its right-hand position shifts the connection of the center tap 28 from the right-hand side of the primary winding 5 to the left-hand side thereof. In this latter connection the charging current for the condensers 6 flows through the primary winding 5 connected in series with said condenser 6 in the D. C. circuit. Upon ignition of the tube 22, the discharge current from the condenser 6 will flow through the primary winding 5 in the opposite direction to the charging current. Thus if any residual D. C. flux remains at the termination of a weld, the subsequent charging current will be in a direction to neutralize said residual D. C. flux.

Figure 3:
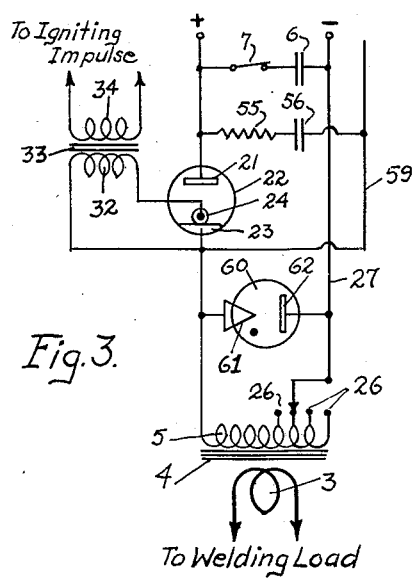
Fig. 3 is a diagram illustrating a modified form of the arrangement shown in Fig. 1, in which two discharge tubes are used for controlling the discharge of the condenser current instead of a single tube as in Fig. 1.

In the arrangement described above, the second anode 25 has impressed upon it a relatively high negative potential immediately after the anode 21 starts to conduct current. Therefore, the tube 22 must be built in such a way that the anode 25 is able to withstand such a high negative voltage without causing a flash-back. In some instances this presents a rather difficult tube construction problem. If, however, the shunt path for the primary winding 5 is provided by a separate tube, the tube construction problem is considerably simplified. An example of such an arrangement is shown in Fig. 3 in which the same reference numerals are applied where the elements are identical with those shown in Fig. 1. In the case of Fig. 3, the tube 22 no longer has the second anode 25 but contains only a single anode 21. In order to provide a shunt path across the primary winding 5, a separate rectifying tube 60 is connected across said primary. This tube is preferably of the type having a gas or vapor filling and carrying relatively heavy currents at low voltage drop in the presence of the ionization of the gas or vapor. The tube 60 has a permanently energized cathode 61 of any suitable type. This cathode may conveniently be a thermionic filament or any other well-known type of permanently energized cathode, such as, for example, a pool cathode with a keep-alive arc. The cathode 61 is connected to the left-hand end of the primary winding 5. The tube 60 is also provided with an anode 62 connected to one of the taps 26.

The operation of the modification shown in Fig. 3 is exactly the same as that described in connection with Fig. 1. The tube 22 is initially ignited and the condensers 6 are discharged through said tube and the primary winding 5. At the time T, as indicated in Fig. 2, the tendency for the voltage to reverse across the condensers 6 causes a discharge to start flowing through the tube 60, and causes the tube 22 to become extinguished. Thereafter the tube 60 provides a short-circuited path across the primary winding 5, and the current decays along the exponential curve $I_r$, as indicated in Fig. 2.

Figure 4:
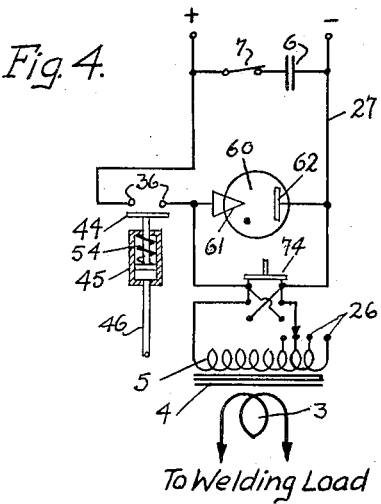
Fig. 4 is a diagram showing the use of a mechanical switch for initiating the weld instead of a discharge tube as in Fig. 3.

With the provision of a separate tube 60, as illustrated in Fig. 3, the tube 22 no longer is required to perform any rectifying action. Under these conditions the tube 22 acts merely as a switch. It is possible, therefore, to replace the tube 22 by a mechanical switch, as illustrated by the modification represented in Fig. 4. In this figure likewise identical reference numerals are applied to elements which are identical with those represented in Fig. 1. In Fig. 4 the tube 22 is replaced directly by the contacts 36 which are adapted to be closed by the armature 44 of the pressure-responsive switch 45. Therefore, instead of the pressure-responsive switch 45 igniting a separate tube, as in Fig. 1, it closes the discharge circuit from the condensers 6 directly through the contacts 36. The operation of the system shown in Fig. 4 is identical with that shown in Fig. 3, except that the connection 36 is maintained closed even after the tube 60 has started to conduct current. However, since the voltage drop across the tube 60 is very low as compared with the total voltage originally supplied to the condensers 6, only an insignificant amount of reverse current will flow to said condenser. Also since the direct current supply source is deenergized, as illustrated in the complete diagram shown in Fig. 1, there is no danger of the direct current from the source feeding directly through the primary winding 5. In Fig. 4 there is also illustrated another arrangement for eliminating D. C. saturation of the core of the welding transformer 4. For this purpose the primary winding 5 is connected to the energy supply system through a reversing switch 74. The switch 74 is shifted from one position to the other between each weld. Therefore, in successive welds the discharge current will flow through the primary winding 5 in opposite directions, thus substantially eliminating the tendency for D. C. saturation of the core of transformer 4 to occur. It is to be understood that this method of reversing the flux in the transformer 4 could be applied to any of the other modifications illustrated herein.

Instead of using a permanently-energized cathode type of tube across the primary winding of the welding transformer, as indicated in Figs. 3 and 4, a tube of the ignition type may be used as illustrated in the modification shown in Fig. 5. Here again identical reference numerals are applied to elements which are identical with those shown in the previous figures. In Fig. 5 the tube 60 of Figs. 3 and 4 is replaced by a tube 63 of the ignition type which is preferably of the same type as tube 22. The tube 63, therefore, has a pool type cathode 64, an anode 65, and an igniter 66. As indicated in connection with tube 22, this igniter may be of any convenient type, but is preferably of the electrostatic type described more fully in connection with said tube 22.

The cathode 64 is connected directly to the left-hand end of the primary winding 5, while the anode 65 is connected to one of the taps 26 on said primary winding. The igniter 66 is supplied with igniting impulses from the secondary winding 67 of an ignition transformer 68 whose primary winding 69 is connected across a resistance 70. The resistance 70 is connected in series with a rectifying tube 71. The rectifying tube 71 may be of small current-carrying capacity, but preferably is one which can satisfactorily withstand the negative voltage applied to the condenser 6. The rectifier tube 71 is provided with a permanently energized cathode 72 connected to the positive side of the direct current supply and also with an anode 73 connected through the resistance 70 to the negative side of the direct current supply. In this way the voltage across the tube 71 is the voltage on the condenser 6. Due to the polarity of the connections as described above, the tube 71 ordinarily does not conduct current. However, when the voltage across the condenser 6 reverses at the time T, as represented in Fig. 2, the voltage across the tube 71 likewise reverses, and therefore causes current to start flowing through said tube. This current flow sets up a voltage across the resistance 70 which is impressed upon the primary winding 69, and thus supplies an igniting impulse through the secondary winding 67 to the igniter 66. The tube 63 thereupon starts to conduct current, and furnishes the short-circuited path across the primary winding 5 which operates as described previously in connection with the previous modifications. Only a relatively small voltage drop across the resistance 70 is needed to supply the igniting impulse to the igniter 66. Therefore this action occurs within a relatively short time interval after the time T (Fig. 2), so that the shape of the current in the load circuit in the modification shown in Fig. 5 is substantially identical with that represented in Fig. 2. In order to prevent the reverse charge on the condensers 6 from discharging back through the rectifiers, a sufficient value of resistance 75 may be included in the connection 27 in order to restrict such flow of current through the rectifiers to a reasonable value.

In the various embodiments described above, it is to be understood that the constants are so chosen that, following the closure of the contacts 18, the condensers 6 are charged to their predetermined desired voltage before the contacts 36 are closed to effect a discharge of said condensers. In those cases where this sequence of operations occurs automatically, the speed of the automatic timing means used is of the proper value while, if the sequence of operations is determined by the operator, the operator merely adopts the precaution of timing the individual welds below a certain predetermined maximum speed.

Of course it is to be understood that this invention is not limited to the particular details as described above inasmuch as many equivalents will suggest themselves to those skilled in the art. For example, certain aspects of this invention can be applied to welding systems which do not utilize condensers but which supply a pulse of current to the welding load. In such cases my invention may be utilized to cause an exponential decay of such a pulse of welding current. Also there are other circuit-closing means which can be used to accomplish the various functions performed by the tubes described above. Various ways of obtaining circuits equivalent to those illustrated may be utilized. For example, the shunt rectifier can be coupled across the transformer in any well-known manner instead of being directly connected across the primary. Thus when such a rectifier or shunt circuit is defined as being "connected across the input to said load circuit," or some similar phrase, it is intended that such alternative ways of coupling shall be included. Also where transformation of the welding current is not desired, the welding transformer could be eliminated. Further it is not necessary for the sequence of switching operations described to be controlled directly from the welding electrodes inasmuch as these switches can be operated independently or automatically in accordance with any desired schedule of operations. Various other ideas as to the utilization of the principles enunciated herein will suggest themselves to those skilled in the art. It is accordingly desired that the appended claims be given a broad interpretation commensurate with the scope of the invention within this art.

What is claimed is:

1. A welding system comprising condenser means for storing electrical energy, a source of direct current for charging said condenser means, a welding load circuit, a controlled ignition discharge tube having a cathode, and two anodes, said anodes being connected across said condenser means, said cathode and one of said anodes being connected across the input to said welding load circuit, and means for igniting said tube.

2. A welding system comprising condenser means for storing electrical energy, a source of direct current for charging said condenser means, a welding load circuit, means for connecting said condenser means to said load circuit to discharge the charge of said condenser means into said load circuit, a controlled ignition discharge tube connected across the input to said load circuit, and means responsive to a reversal of voltage across the input to said load circuit after the initial surge of condenser discharge current for igniting said discharge tube.

3. A welding system comprising condenser means for storing electrical energy, a source of direct current for charging said condenser means, means for discharging said condenser means into a welding load circuit, means which becomes active upon a tendency for the voltage on said condenser means to reverse for establishing a shunt circuit across the input to said load circuit, and means for varying the rate of rise of said discharge current independently of its rate of decay.

4. A welding system comprising condenser means for storing electrical energy, a source of direct current for charging said condenser means, means for discharging said condenser means into a welding load circuit, means which becomes active upon a tendency for the voltage on said condenser means to reverse for establishing a shunt circuit across the input to said load circuit, and means for varying the inductance of said welding load circuit.

5. A welding system comprising condenser means for storing electrical energy, a transformer, means for discharging said condenser means into the input to said transformer, the output of said transformer supplying a welding load, means which becomes active upon a tendency for the voltage on said condenser means to reverse for establishing a shunt circuit across said transformer, and means for varying the ratio of transformation of said transformer.

6. A welding system comprising condenser means for storing electrical energy, a source of direct current for charging said condenser means, a pair of welding electrodes adapted to close a welding circuit, means for cutting off the supply of direct current to said condenser means upon said welding electrodes moving toward their closed position, means for discharging said condenser means into said welding circuit, and means which becomes active upon a tendency for the voltage on said condenser means to reverse for establishing a shunt circuit across the input to said load circuit.

7. A welding system comprising condenser means for storing electrical energy, a transformer, a source of direct current connected to charge said condenser means through said transformer, means for connecting said condenser means to said transformer to discharge through said transformer in the opposite direction to said charging current, the output of said transformer supplying a welding load, and means which becomes active upon a tendency for the voltage on said condenser means to reverse for establishing a shunt circuit across said transformer.

8. A welding system comprising condenser means for storing electrical energy, a transformer, a source of direct current connected to charge said condenser means through said transformer, means for connecting said condenser means to said transformer in the opposite direction to said charging current, the output of said transformer supplying a welding load.

9. A welding system comprising condenser means for storing electrical energy, a transformer, circuit-closing means for discharging said condenser means into the input to said transformer, the output of said transformer supplying a welding load, and a source of direct current connected across said circuit-closing means for charging said condenser.

10. A welding system comprising condenser means for storing electrical energy, means for discharging said condenser means into a welding load circuit, a controlled ignition discharge tube connected across the input to said load circuit, and means which becomes active upon a tendency for the current in said load circuit to decrease for igniting said discharge tube.

11. A resistance welding system comprising a resistance welding load, condenser means for storing electrical energy, a resistance welding load circuit including said resistance welding load and a welding transformer interposed between said condenser means and said resistance welding load, means for discharging said condenser means into said resistance welding load circuit, and means for substantially preventing a return of energy from said load circuit to said condenser means and for establishing a circuit for dissipating said energy in said welding load.

12. A resistance welding system comprising condenser means for storing electrical energy, a resistance welding load circuit including a pair of resistance welding electrodes and a welding transformer interposed between said condenser means and said electrodes, means for discharging said condenser means into said resistance welding load circuit at a rate at which the current rises along a quarter period of a predetermined oscillatory wave, and means which becomes active upon decay of the current in said load circuit for causing said decay to be substantially exponential.

13. A resistance welding system comprising condenser means for storing electrical energy, a resistance welding load circuit including a pair of resistance welding electrodes and a welding transformer interposed between said condenser means and said electrodes, means for discharging said condenser means into said resistance welding load circuit, the constants of the discharge circuit of said condenser having values to tend to cause said discharge current to be oscillatory, and means which become active upon decay of the current in said load circuit for causing said decay to be substantially exponential.

14. A resistance welder comprising a circuit including a welding transformer, a power condenser, a source of direct current, means for intermittently releasing energy from said source to charge said condenser through the primary of said transformer, means for intermittently discharging said condenser through the primary of said power transformer after each charge thereof, and a rectifier connected in shunt with said condenser and poled to pass current during the collapse of the magnetic field of said primary after the discharge of said condenser has been completed, thus preventing inverse charging of said condenser to a voltage higher than the internal voltage drop of said rectifier.

15. A resistance welder comprising a welding transformer, a power condenser, means for intermittently charging said power condenser with a surge of current through the primary of said transformer, means for intermittently discharging said condenser with a surge of current through the primary of said transformer, and means whereby the current through said primary during the charging of said condenser is in an opposite vectorial direction to the current through said primary during the discharging of said condenser.

16. A resistance welder comprising a welding transformer, a power condenser, means for intermittently charging said condenser, means for intermittently discharging said condenser, and means whereby during the charging of said condenser a surge of current is passed through the primary of said transformer in one vectorial direction and during the discharging of said condenser a surge of current is passed through said primary of said transformer in the opposite vectorial direction.

17. A resistance welder comprising a circuit including a welding transformer, a power condenser, a source of direct current, means for intermittently releasing surges of current from said source through said transformer primary to charge said condenser, and means for intermittently discharging said condenser by surges of current through said transformer primary after each charge thereof.

18. In a system of the capacitor discharge type having a transformer constituting an inductive load arranged to be energized by discharge of the capacitor the combination of a load circuit including said capacitor and the primary of said transformer in series, means to render said circuit conductive and non-conductive, and means comprising a rectifier in shunt with said capacitor to prevent oscillation in said load circuit during discharge of said capacitor through said circuit.

19. In an electric welding system of the capacitor discharge type the combination of a capacitor for storing welding energy, an alternating current source, rectifying means for charging said capacitor from said source, a welding transformer having its primary adapted to be connected to said capacitor and its secondary connected to a welding load circuit, means to discharge said capacitor through said primary, and means to direct the current flow from said capacitor through said primary in alternate directions in succeeding welding operations.

20. Apparatus of the character described comprising in combination a capacitor, an alternating current source, rectifying means for charging said capacitor from said source, a transformer having its primary adapted to be connected to said capacitor and its secondary connected to a load circuit, means to discharge said capacitor through said primary, and means to reverse the direction of current flow through said primary in each succeeding discharge of said capacitor.

21. Apparatus of the character described comprising in combination a capacitor, a load circuit, a transformer having a primary winding adapted to be energized by the discharge of said capacitor and a secondary winding connected to said load circuit, means to discharge said capacitor through said primary winding in alternate directions in succeeding operations, and means comprising a rectifier to establish a uni-directional current path in shunt with said capacitor to suppress oscillation in the capacitor-primary winding circuit during discharge of said capacitor.

22. Welding apparatus comprising in combination, an electrical energy storing device, a charging circuit for said device, a discharging circuit for said device including the primary of a welding transformer, and means to prevent oscillation in said discharging circuit during operation thereof comprising a rectifier connected across said device during said operation.

23. In combination, a supply circuit, a load circuit, a capacitance, means for charging said capacitance from said supply circuit, a transformer having a core member, a primary winding and a secondary winding connected to said load circuit, means for initiating discharge of said capacitance through said primary winding and comprising an electric valve means, and a pair of reversing contactors for controlling the energization of said primary winding so that successive impulses of current transmitted therethrough by the discharge of said capacitance impress opposing magnetomotive forces on the core member of said transformer thereby preventing cumulative unidirectional magnetization.

24. In combination, a supply circuit, a load circuit, a capacitance, means for charging said capacitance from said supply circuit, a transformer having a winding section and being connected to said load circuit, means for initiating discharge of said capacitance through said winding section and including an electric valve, and a pair of reversing contactors connected between said winding section and said electric valve.

25. In combination, a supply circuit, a capacitance, means for charging said capacitance from said supply circuit, a welding machine comprising a pair of welding electrodes, means for exerting pressure on the work comprising a ram for actuating at least one of said electrodes, fluid pressure means for actuating said ram, means for initiating the charging operation of said capacitance, starting means for said welding machine operable to initiate movement of said electrodes to work-engaging position, means comprising an electric valve means for effecting discharge of said capacitance to supply welding current to said electrodes, excitation means for said electric valve means, and timing means responsive to operation of said starting means for operating said excitation means to initiate conduction of said electric valve means.

26. In combination, a supply circuit, a capacitance, means for charging said capacitance from said supply circuit, a welding machine comprising a pair of welding electrodes, means for initiating the charging operation of said capacitance, starting means for said welding machine including means for initiating movement of said electrodes to work-engaging position, electric valve means connected between said capacitance and said welding machine for discharging said capacitance and for supplying welding current to said electrodes, excitation means for said electric valve means to initiate conduction of said electric valve means, relay means for operating said excitation means, and means for automatically resetting said relay means after each discharge of said capacitance, and for effecting recharge of said capacitance by said charging means.

27. In combination, a reactor, an electric discharge device having an anode and cathode in circuit with said reactor and a control electrode, means for impressing a potential across said reactor for supplying current thereto, means for varying said impressed potential, and a control circuit for said device extending from said control electrode to said cathode and including said reactor for controlling the conductivity of said device in response to the variation of the potential across said reactor as said impressed potential is varied.

28. In combination, a reactor, an electric discharge device having a pair of principal electrodes in circuit with said reactor and a control electrode, means for impressing a potential across said reactor for supplying current thereto, means for varying said impressed potential, a control circuit extending between said control electrode and one of said principal electrodes and including said reactor for controlling the conductivity of said device in response to the variation in the polarity of the potential across said reactor as said impressed potential is varied.

29. In combination, a supply circuit, a load circuit, a capacitance, means for charging said capacitance from said supply circuit, a transformer having a core member, a primary winding and a secondary winding connected to said load circuit, means for initiating discharge of said capacitance through said primary winding, and a pair of reversing contactors for controlling the energization of said primary winding so that successive impulses of current transmitted therethrough by the discharge of said capacitance impress opposing magnetomotive forces on the core member of said transformer thereby preventing cumulative unidirectional magnetization.

30. In combination, an alternating current supply circuit, a load circuit, transforming means having a magnetic core member, primary winding means and secondary winding means connected to said load circuit, normally non-conducting electric valve means connected between said supply circuit and said primary winding means and being of the type employing an ionizable medium capable of supporting an arc discharge, means for rendering said electric valve means conducting and for transmitting current to said primary winding means from said alternating current circuit, and unidirectional conducting means connected to said transforming means to prevent the inductance thereof from extending the time of conduction of the electric valve means into the region where appreciable stored electromagnetic energy will be transferred from said transforming means to said supply circuit.

31. In combination, an alternating current supply circuit, a load circuit, transforming means having a magnetic core member, primary winding means and secondary winding means connected to said load circuit, normally non-conducting electric valve means connected between said supply circuit and said primary winding means and being of the type employing an ionizable medium capable of supporting an arc discharge, means for rendering said electric valve means conducting and for transmitting current to said primary winding means from said alternating current circuit, and unidirectional conducting means connected to said transforming means to extend the duration of the impulse of current transmitted to said load circuit.

32. In combination, an alternating current supply circuit, a load circuit, transforming means having a magnetic core member, primary winding means and secondary winding means connected to said load circuit, normally non-conducting electric valve means connected between said supply circuit and said primary winding means and being of the type employing an ionizable medium capable of supporting an arc discharge, means for rendering said electric valve means conducting and for transmitting current to said primary winding means from said alternating current circuit, and electric valve means connected to said primary winding means and responsive to the voltage thereof for providing a path for the flow of current incident to the electromagnetic energy stored in said transforming means occasioned by the conduction of current by the first mentioned electric valve means and for causing the decay of current exponentially in said load circuit.

33. In combination, a capacitance, a charging circuit for said capacitance, a discharge circuit for said capacitance comprising a transformer having a primary winding, an electric valve connected across said primary winding, means for initiating discharge of said capacitance through said discharge circuit, and means for controlling the conductivity of said electric valve and for permitting conduction thereof during only a predetermined interval of time after the initiation of the discharge of said capacitance.

34. Apparatus for electric welding comprising a capacity, a supply source, circuit connections from the capacity to the supply source for the charging of the capacity, means connected to one terminal of the capacity for supporting the work to be welded, an electrode associated with the supporting means and movable with relation to the work supported by the supporting means, connections from the capacity to the electrode for discharging the former through the work and electrode and a switch operatively connected to the electrode for opening of its contacts on movement of the electrode toward the work and said switch being connected in circuit with the supply source to thereby open the latter during the welding operation.

35. An apparatus for electric welding comprising a capacity, terminals on said capacity, a source of supply, means for charging said capacity comprising circuit means connecting said capacity to said source of supply, means for supporting the work to be welded, circuit means connecting said support means to one of said terminals, an electrode, means for discharging the capacity through said electrode and said work, said latter means comprising circuit means connecting said electrode to the other said terminal and including means for simultaneously opening the charging circuit.

36. A welding system comprising a condenser, means to charge said condenser, a welding circuit comprising a welding transformer adapted to be energized by said condenser, and means to reverse the direction of current flow through the primary of said transformer in each succeeding welding cycle.

37. A system comprising condenser means for storing electrical energy, a transformer feeding a load, said transformer having a magnetic core, means for charging said condenser means, means for discharging said condenser means through said transformer for supplying a pulse of current to said load, and means for controlling said discharge means to pass the discharge current of said condenser means in opposite directions through said transformer for alternate operations.

38. A system comprising condenser means for storing electrical energy, a transformer feeding a load, said transformer having a magnetic core, means for charging said condenser means, means for discharging said condenser means through said transformer in one direction, and means for discharging said condenser means through said transformer in the opposite direction for alternate operations.

39. A resistance welder comprising a circuit including a welding transformer, an energy storing device, a source of current, means for successively charging said device from said current source, and switching means effecting successive discharge of said device alternately in opposite directions through the primary of said welding transformer.

40. A resistance welder comprising a circuit including a welding transformer, an energy storing device, a source of current, means for successively charging said device from said current source, and switching means in series with said welding transformer primary during the discharge of said device effecting successive discharges of said device alternately in opposite vectorial directions through said welding transformer primary.

41. A resistance welder comprising a circuit including a welding transformer, a power condenser, a source of direct current, means for charging said power condenser from said source, and means for discharging said power condenser in alternate vectorial directions through said welding transformer primary to effect complete demagnetization of the core of said welding transformer for the purpose of obtaining maximum efficiency of said transformer.

42. A resistance welder comprising a circuit including a welding transformer, a power condenser, a source of direct current, means for charging said power condenser from said source, means for alternately discharging said power condenser in opposite vectorial directions through the primary winding of said welding transformer in order to alternately reverse the vectorial direction of the welding current flow in the secondary winding of said welding transformer.

43. A resistance welder comprising a circuit including a welding transformer, an energy storing device, a source of current, means for successively charging said device from said current source, means for successively discharging said device alternately in opposite vectorial directions through the primary of said welding transformer, and uni-directional means in series with said welding transformer primary during the discharge of said device.

44. A resistance welder comprising a circuit including a welding transformer, an energy storing device, a source of current, means for successively charging said device from said current source, and means for successively discharging said device alternately in opposite vectorial directions through the primary of said welding transformer and effecting a surge of useful energy to be released in said welding transformer primary due to the collapse of the magnetic field in said primary following each discharge of said device therethrough.

JOHN W. DAWSON.

REFERENCES CITED

The following references are of record in the file of this patent:

UNITED STATES PATENTS

| Number | Name | Date |
| --- | --- | --- |
| Re. 17,949 | Chubb | Feb. 3, 1931 |
| 1,168,346 | Thomson | Jan. 18, 1916 |
| 1,433,853 | Sethman | Oct. 31, 1922 |
| 2,085,696 | Edwards | June 29, 1937 |
| 2,105,899 | Wright | Jan. 18, 1938 |
| 2,120,565 | Lord | June 14, 1938 |
| 2,134,538 | Stoddard et al. | Oct. 25, 1938 |
| 2,151,749 | Dawson | Mar. 28, 1939 |
| 2,179,105 | Sidney | Nov. 7, 1939 |

FOREIGN PATENTS

| Number | Country | Date |
| --- | --- | --- |
| 474,553 | Great Britain | Nov. 3, 1937 |